United States Patent [19]

Orban et al.

[11] Patent Number: 4,754,641
[45] Date of Patent: Jul. 5, 1988

[54] METHOD AND APPARATUS FOR MEASUREMENT OF FLUID FLOW IN A DRILLING RIG RETURN LINE

[75] Inventors: Jacques J. H. Orban, Sugarland; Klaus J. Zanker; Andre E. Orban, both of Houston, all of Tex.

[73] Assignee: Schlumberger Technology Corporation, Houston, Tex.

[21] Appl. No.: 13,132

[22] Filed: Feb. 10, 1987

[51] Int. Cl.⁴ .............................................. E21B 47/10
[52] U.S. Cl. ............................................ 73/155; 73/3
[58] Field of Search ................... 73/155, 3, 32 R, 198, 73/290 V; 364/422

[56] References Cited

U.S. PATENT DOCUMENTS

| | | | |
|---|---|---|---|
| 4,145,914 | 3/1979 | Newman | 73/290 V |
| 4,202,211 | 5/1980 | Perry | 73/198 |
| 4,217,777 | 8/1980 | Newman | 73/198 |
| 4,261,196 | 4/1981 | Scheid, Jr. | 73/32 R |
| 4,527,425 | 7/1985 | Stockton | 73/155 |
| 4,694,692 | 9/1987 | Brown et al. | 73/155 |

OTHER PUBLICATIONS

Buffham, B. A., Laminar Flow in ... Lenticular Tubes, From Trans. Instn. Chem. Engrs., vol. 46, 1968, pp. T152–T157.

Primary Examiner—Jerry W. Myracle
Attorney, Agent, or Firm—Stephen L. Borst

[57] ABSTRACT

An improved method and apparatus is disclosed for use in a return line system of a drilling rig to determine a volumetric fluid flow rate and, therefore, to aid in detecting a kick in a well. The apparatus comprises an ultrasonic level sensor, an ultrasonic Doppler velocity sensor and a digital computer electrically coupled to the level sensor and the Doppler velocity sensor to determine the fluid flow regime in the return line system. The flow regime is determined by the programmed computer to accurately determine the volumetric fluid flow rate in the return line system in real time, during drilling operations.

27 Claims, 7 Drawing Sheets $D = L + h + SED$

IF LAMINAR FLOW:
PARABOLIC VELOCITY PROFILE

IF TURBULENT FLOW:
VERY FLAT VELOCITY PROFILE

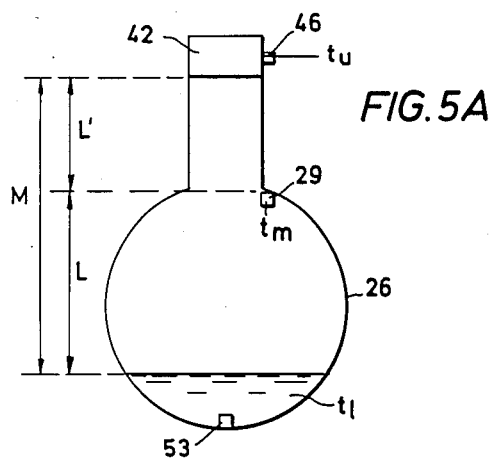
FIG.5A
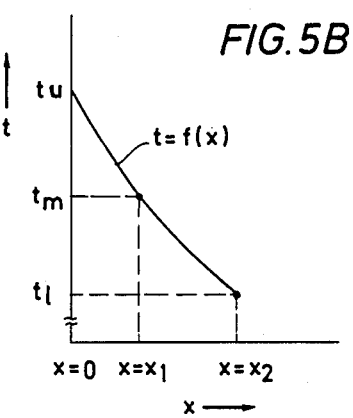
FIG.5B
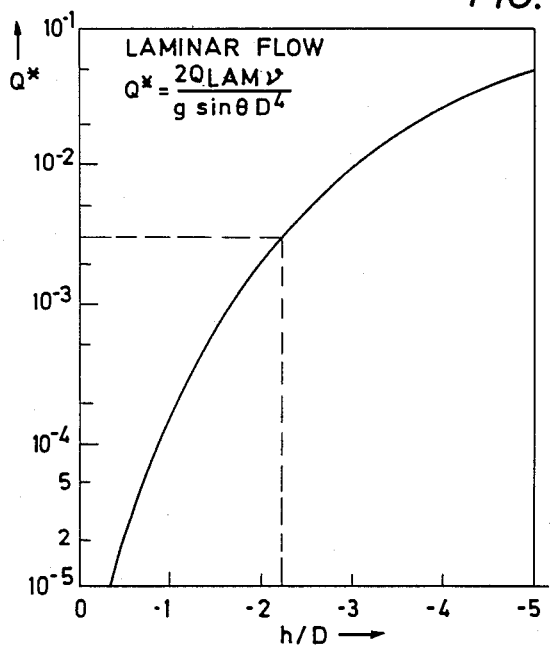
FIG.6A
FIG.6B
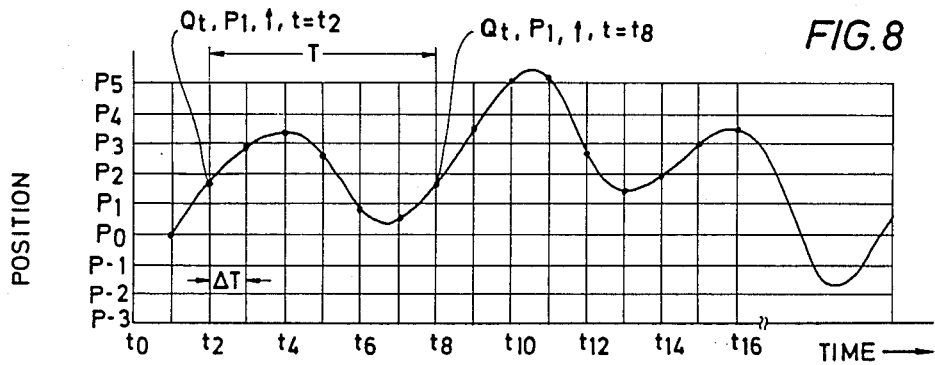
FIG.8

METHOD AND APPARATUS FOR MEASUREMENT OF FLUID FLOW IN A DRILLING RIG RETURN LINE

BACKGROUND OF THE INVENTION

1. Field of the Invention

This invention relates generally to the field of measuring the volumetric flow rate of a fluid. More particularly, the invention relates to a method and apparatus for measuring the volumetric flow rate of a fluid in a drilling rig return line in real time.

2. Description of the Prior Art

Well control and blowout prevention has become an important concern in the oil and gas drilling industry for a number of reasons. Well blowouts cause higher drilling costs, possible loss of life, and waste of natural resources. An additional reason for concern is the increasing number of governmental regulations and restrictions being placed on offshore drilling operations partially as a result of recent, much-publicized well control incidents.

A kick can be defined as a well control problem in which the pressure found within the drilled formation is greater than the mud or fluid hydrostatic pressure acting on the borehole or face of the formation. This formation pressure causes fluids to flow from the formation into the well bore. In almost all drilling operations, the operator attempts to maintain a hydrostatic pressure greater than the formation pressure and thus prevent kicks. On occasion however, and for various reasons, the formation pressure exceeds the mud pressure and a kick will occur. Kicks have become even more common due to the present trend of increasing drilling rates by using lighter drilling mud.

Another problem encountered when drilling a well is drilling fluid loss into the formation. This problem, known by the shorthand term, "Lost Circulation", occurs where the drilling fluid is flowing into a subterranean formation through which the borehole passes. Such condition should be detected quickly by a driller to prevent damage to such a formation and excessive loss of the drilling fluid.

A number of kick or lost circulation "indicators" can be observed at the surface before a kick has had time to result in a dangerous blowout or excessive time has elapsed since the beginning of lost circulation. Three of these are:

FLOW RATE CHANGE—An increase in the flow-out or flow rate leaving the well while pumping at a constant rate is one of the primary kick indicators. The increased flow rate is interpreted to mean that the formation is forcing formation fluids into the well bore. A decrease in the flow rate exiting from the well while pumping at a constant rate is an indicator of lost circulation.

FLOWING WELL WITH PUMPS OFF—When the rig pumps are not moving the mud, a continued flow-out from the well indicates that a kick is in progress. An exception to this indicator is when the mud in the drill pipe is considerably heavier than that in the annulus, as in the case of a slug.

PIT VOLUME CHANGE—If the volume of fluid in the pits is not changed as a result of surface controlled actions, an increase in pit volume indicates that a kick is occurring. The fluids entering the well bore as a result of the kick displace an equal volume of mud at the flow line and result in a pit gain. A decrease in pit volume under these conditions indicates lost circulation.

Two of the kick early warning signs described above require measurement of an increase in flow rate from the fluid return line while the other requires measurement of an increase in pit volume. These indicators are difficult to interpret when drilling from a floating drilling vessel because of the heaving and rolling of the drilling vessel in response to wind and waves. Floating drilling vessel heaving and rolling creates fluid return line flow rate changes.

It has been found that the time elapsed between the beginning of a kick deep in the well and its detection at the surface by pit level monitoring is too long to provide sufficient time to bring the well under control, usually by adding weight to the drilling fluid.

Studies have shown that accurate differential flow measurement, of the order of 25 gallons per minute (GPM) of a total of 1200 GPM, provides the earliest possible surface detection of kicks and/or lost circulation. This method requires the use of flow meters of high absolute accuracy under widely varying conditions, for both flow-in and flow-out systems.

Presently, flow-in measurement is based on the number of strokes per minute of triplex mud pumps (see FIG. 1). The flow rate obtained from the pump strokes is then corrected by a volumetric pump efficiency. This pump efficiency can fluctuate between 80% to 95%, accounting for inaccuracies of ±10% in the flow-in measurement.

The prior flow-out measurement has usually included a "paddle" system installed in the rig return line. The paddle is a hybrid flow meter based on level and target (force) measurements. The prior art paddle has an uncalibrated accuracy of around 40%. With calibration on the rig site, the "absolute" flow-out measurement is still only accurate to 10% or 15%, due to the basic non-linearity of the device, and due to very poor zero stability of the device. Poor zero stability requires frequent re-calibration.

Using the pump strokes and the paddle measurement for flow-in and flow-out, respectively, the best accuracy for the differential flow over the entire fluid flow range, cannot be better than 25% or 300 GPM (gallons per minute) in 1200 GPM. This is more than 10 times the required accuracy, rendering prior methods of differential flow rate measurement inadequate for desired kick detection.

Electro-magnetic flow meters have also been used but have drawbacks. They do not work in oil based muds (conductivity too low). They require complete modification of the return line. In offshore rigs where the return line is short and space is limited, there is usually no way to install them. They require expensive maintenance to sustain their accuracy.

Other industries have developed flow measuring systems suitable for use in waste water monitoring systems where sewer outflows must be monitored for pollution control purposes. These systems obtain flow measurements based on the velocity of the fluid in a channel and the area of the channel occupied by the flowing liquid. Ultrasonic level detectors and Doppler type velocity detection units have been used for these applications.

U.S. Pat. No. 4,217,777 to Newman issued Aug. 19, 1980 discloses such a system and is incorporated herein for essential material and for all other purposes. Also U.S. Pat. No. 4,202,211 to Perry issued May 13, 1980 discloses a similar system and is incorporated herein for essential material and for all other purposes.

Ultrasonic level detection systems are known in the art. Such systems are described in U.S. Pat. No. 4,024,766 to Perry issued May 24, 1977 and in U.S. Pat. No. 4,145,914 to Newman issued Mar. 27, 1979, both of which are incorporated herein for all purposes.

The fluid flow in the rig return line is characterized as supercritical flow. None of the known prior art accurately measures volumetric flow rate for flows in supercritical flow conditions. Though the above four U.S. Patents disclose ultrasonic measuring devices, they do not disclose or teach distinguishing between flow regimes which include laminar and turbulent flow so as to determine sufficiently accurately a volumetric fluid flow rate which can be used for real time kick or lost circulation detection on a drilling rig.

3. Identification of Objects of the Invention

It is an object of the invention to provide an improved method and apparatus for the measurement of volumetric fluid flow rate which is significantly more accurate than prior art methods and provides the measurement in real time while drilling.

It is another object of the invention to provide an improved fluid flow rate measuring system which obtains volumetric flow measurements based on the measured velocity of the fluid in a conduit, the cross-sectional area of the conduit occupied by the flowing fluid, and a determination as to whether the flow is laminar or turbulent.

It is a still further object of the invention to provide an improved system for accurately measuring flow rate by distinguishing between flow regimes.

It is still another object of the invention to provide an improved method and apparatus for use in a return line of a drilling rig to quickly and accurately detect a kick or lost circulation in the well bore.

It is another object of the invention to provide a volumetric flow measuring system for accurately measuring flow rate of a fluid in supercritical flow conditions.

It is still another object of the invention to provide all the foregoing measurements on a floating rig while simultaneously suitably compensating for the effects of rig heave.

SUMMARY OF THE INVENTION

According to the invention, an improved method and apparatus is disclosed for use in a return line system of a drilling rig to aid in accurately determining a volumetric fluid flow rate and, therefrom, to quickly and accurately detect a kick or lost circulation in the well bore.

The apparatus includes an ultrasonic level sensor, an ultrasonic Doppler velocity probe and a digital computer electrically coupled to the level sensor and the doppler probe to determine, under program control, the fluid flow regime in the return line system. The flow regime is used by the computer to accurately determine the volumetric fluid flow rate in the return line in real time.

The level measurement is made with an ultrasonic level sensor through the air above the flowing fluid. The velocity is measured by an ultrasonic Doppler probe which takes its measurement in a well defined volume of fluid at the location of the level measurement.

The digital computer under program control processes input data in conjunction with stored input data to determine whether the flow in the return line is laminar or turbulent. In order to obtain an accurate determination of level of the flowing fluid, the output of the level sensor is temperature compensated by means of temperature data measured at two, preferably three locations representative of the temperature of the air through which ultrasonic pulses travel. Compensation is necessary because the mud is hot (180° F.) and the stop/start nature of drilling does not allow thermal equilibrium to be established.

In order to increase accuracy of the flow rate measurement, any sediment level in the return flow line is measured under zero flow conditions with the level sensor. An accurate determination of sediment level insures that an accurate determination of the cross-sectional area of flow is determined which is used in the flow rate calculation.

The flow regime is determined by first assuming that the flow is laminar. That assumption is tested periodically with real time measurement of level h and velocity v with stored numerical information of the geometry of the return line. A correction factor for laminar flow is determined which when multiplied by the measured velocity and the measured cross-sectional area of the return line (as a function of measured level) yields an accurate determination of instantaneous laminar flow rate.

A value of viscosity associated with such laminar flow is determined and then the Reynolds number associated with such viscosity is calculated. A test is then made to determine if such Reynolds number determination satisfies the laminar flow assumption.

If the laminar flow assumption is not satisfied by the Reynolds number test, the flow regime must be turbulent. By means of instantaneous velocity and level measurement information, the local friction factor at the measurement location is determined using an analysis comparing free gravity flow to actual measurements. The local friction factor is then used to obtain an accurate correction factor for the turbulent flow velocity profile. Such correction factor is multiplied with the instantaneous velocity and the instantaneous cross-sectional area to yield an accurate determination of turbulent regime flow rate.

An averaging process which uses a variable averaging period is used to determine an average flow rate for floating rigs where the instantaneous flow rates are varying as a result of the heave and pitch of the rig.

A method of using the level sensor alone is presented based on stored data when both the velocity and level sensors were known to be operating properly.

Output measurements determined periodically of average output flow rate, differential flow rate between the output flow from the well and the flow into the well, and viscosity as determined from the flow regime calculations are recorded as a function of time. The differential flow rate is used to drive a driller's gauge as a warning of a kick or lost circulation in the well.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIGS. 5A and 5B illustrate respectively a cross-section of a return line with temperature sensors located at top, bottom and mid-way positions between a level sensor and the fluid and a graphical example of the determination of a functional relationship between temperature and the distance between the head of the level sensor and the fluid in the return pipe;

FIG. 6A illustrates the relationship between laminar flow rate and a parameter h/D used in the determination of viscosity and whether the flow is laminar or turbulent;

FIG. 6B shows relationships between friction factor of the return line as a function of Reynolds number used in the determination of whether the flow is laminar or turbulent;

FIG. 8 illustrates the method by which average flow rate is determined from instantaneous flow rates under conditions of a heaving drilling rig.

DETAILED DESCRIPTION OF THE PREFERRED EMBODIMENT

Figure 1:
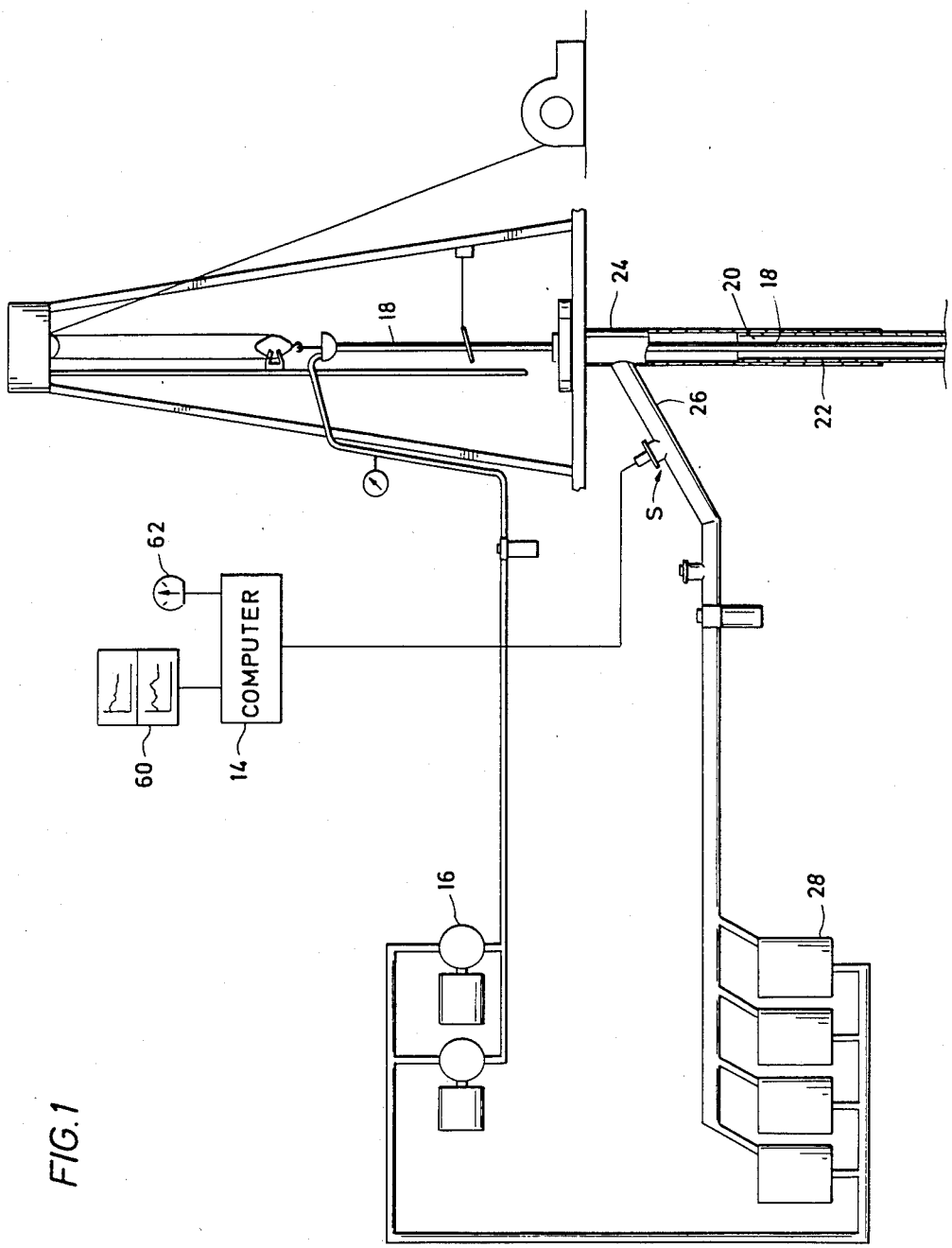
FIG. 1 is a schematic view of a drilling fluid or "mud" circulation system for a floating drilling rig where a flow measuring system embodying the invention may be used.
Figure 2:
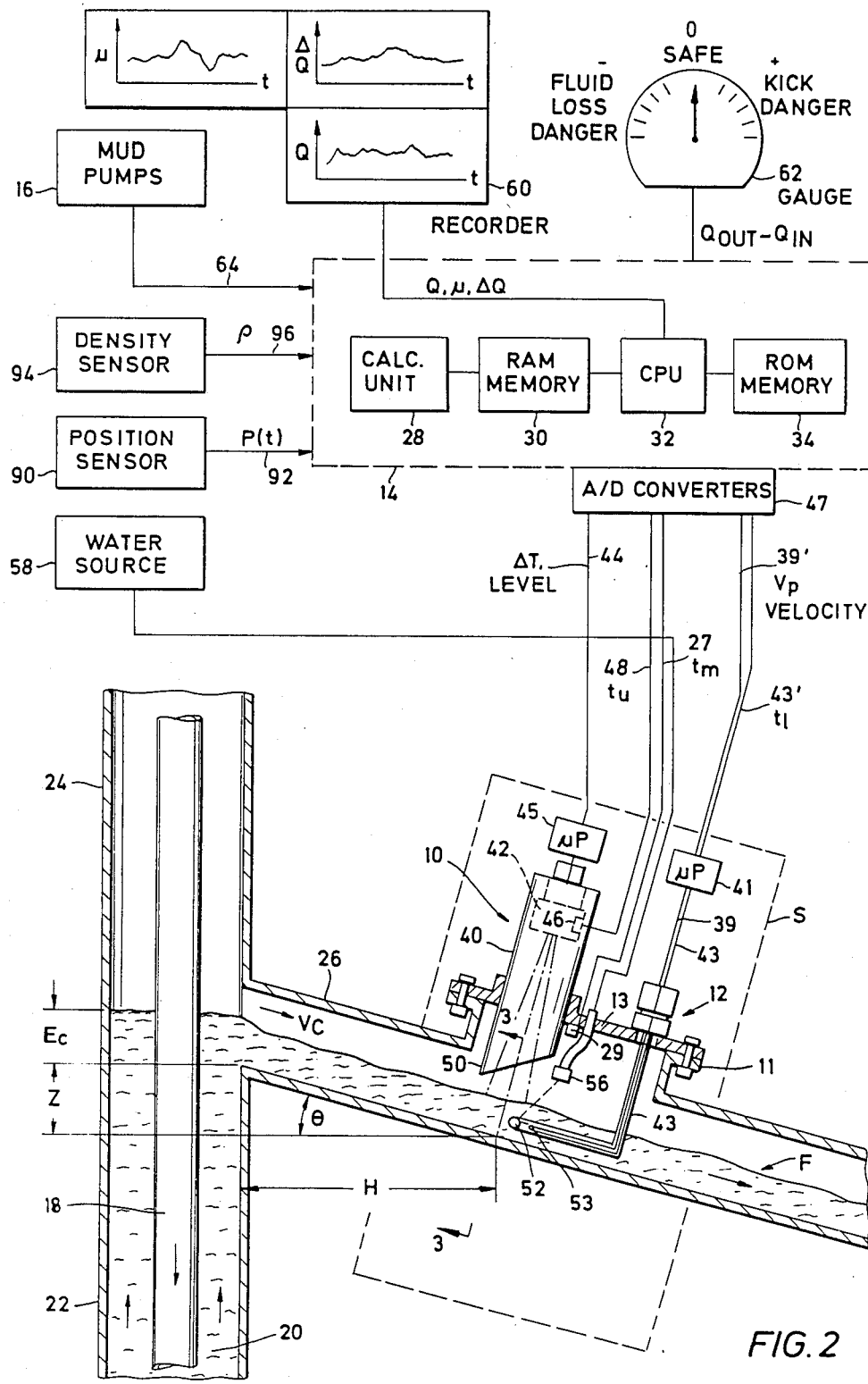
FIG. 2 is a cross-sectional view of a return line system of the invention illustrating the retrofitting of an ultrasonic sensor system into a preexisting opening for a prior art paddle in the return line and schematically illustrating connection of the sensor system to a computer and associated instrumentation.

The volumetric flow sensor system, generally designated S, and associated computer 14 embodying the invention is illustrated in FIGS. 1–4. The flow measuring system includes an ultrasonic level sensor 10, an ultrasonic Doppler velocity probe 12 and a processing means or digital computer 14, as best illustrated in FIGS. 2 and 4.

Referring to FIG. 1, a floating drilling rig mud circulation system is schematically illustrated. Although a floating drilling rig is illustrated, the invention may also be used with a bottom supported offshore drilling rig or a land drilling rig. As discussed above, flow rate into the well may be derived by counting the strokes per minute of mud pumps 16. After the "mud" or drilling fluid travels down the drill string 18, it moves up the annulus 20 between the casing 22 and the drill string 18 to bell nipple 24. A return line 26 communicates with the bell nipple 24, as best shown in FIGS. 1 and 2, to return the mud to the mud pits 28. The flow-out measuring sensor system S according to the invention is disposed in the return line 26 at a lower elevation than the bell nipple 24.

The sensor system S in cooperation with computer 14 is provided to accurately measure in real time the flow Q through return line 26. Volumetric flow Q is simply the product of the cross-sectional area A of fluid flowing at a given location in the line and the average velocity of the fluid moving at that location.

The sensor system S and computer 14 accurately determine the cross-sectional area A of pipe 26 through measurement of the level L from the top of the line 26 to the surface of the drilling fluid. With a measurement of the sediment level in the line 26 when no fluid is flowing in the line, an accurate determination of the area A of the flow may be determined in real time.

Measurement of the velocity at a point in the fluid flow stream, with knowledge of the geometry of the return line allows a determination of the flow regime, whether turbulent or laminar, and consequently allows a more accurate determination of average velocity of the flow. Accurate determination of cross-sectional area and average velocity results in a more accurate determination of drilling return line flow rate, and when combined with flow-in measurements from the mud pumps, results in an accurate timely indicator of a "kick" or lost circulation in the well.

Figure 3:
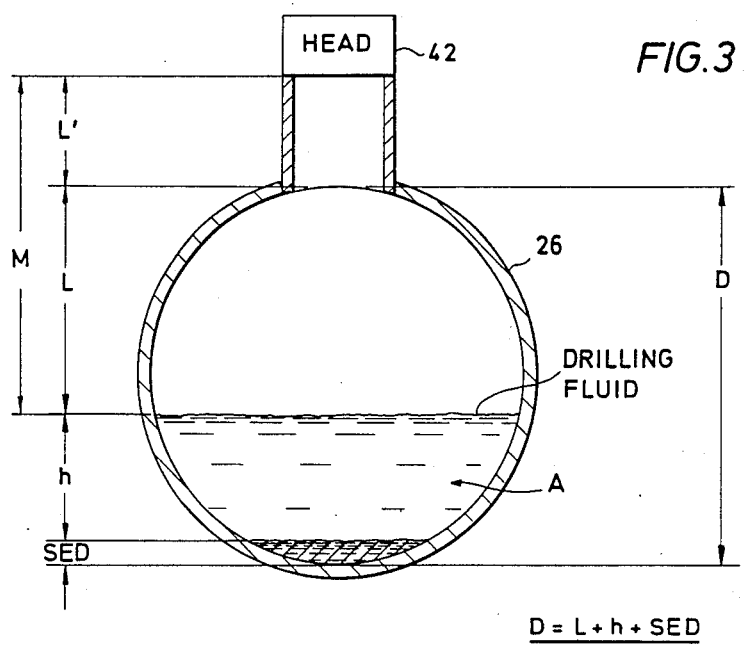
FIG. 3 is a section view along line 3—3 of FIG. 2 illustrating the level sensor location to determine the cross-sectional area of fluid.

The return line 26 usually has a circular cross-sectional area, as best shown in FIG. 3. Other cross-sectional profiles, for example, elliptical, rectangular or square, could be used. For a preferred circular return line 26, the internal diameter D of the return line 26 and the fluid height h allows determination of the fluid cross-sectional area A. FIG. 3 indicates that it is necessary to determine if a sediment level exists in order to make an accurate determination of the area A of the flowing fluid. Measurement of sediment level SED (if any) is described in more detail below.

As illustrated in FIG. 2, sensor system S is preferably constructed to fit upon the flange 11 of an opening in drilling line 26 which has been provided for prior art paddle velocity sensors. It of course may be provided in any other top entry opening in drilling line 26. Thus sensor system S achieves access to the interior of line 26 without the need for line 26 being disconnected from an existing rig hook-up to bell nipple 24.

Alternatively, probe 52 may be inserted through a hole in the bottom of line 26 in the vicinity of the level sensor 10 so that there is no obstruction in the line 26. Such a placement of probe 52 may be indicated where "gumbo" clay formations are expected to be encountered during drilling.

The sensor system S includes a level sensor 10 for measuring the distance L+L', and from that measurement, information for the determination of h (see FIG. 3). Level sensor 10 includes a housing 40 in which an ultrasonic transmitter/receiver is mounted. Ultrasonic pulses from a transmitter within sensor 42 are directed toward the fluid F and return to a detector within sensor 42 to produce a signal on lead 44 proportional to L+L'.

The preferred level sensor 10 includes an ultrasonic head 42 and a microprocessor 45. The head 42 includes a single crystal transmitter/detector and is constructed of PVC with a Buna-N acoustic window. A sound cone dispersion of seven degrees is produced by the crystal. The crystal is a low impedance, passive capacitative element driven by a driving voltage of about 350 V (RMS) at about 40 KHz at a 10% duty cycle.

The microprocessor 45 controls the head 42 and receives differential time information between a generated pulse and its echo from the fluid. An analog signal on lead 44 proportional to the distance L+L' from the head 42 to the fluid (see FIG. 3) is applied to computer 14 via conventional A/D converters 47 for further processing. A temperature sensor 46, disposed near the head 42 applies an analog signal via lead 48 to A/D converters 47 for further processing discussed below. Computer 14 is preferably a Digital PDP-11 minicomputer.

A temperature sensor 53 associated with velocity probe 52 produces a signal representative of temperature at the fluid level on lead 43 to microprocessor 41. An analog signal representative of fluid temperature on lead 43' is applied from microprocessor 41 to A/D converters 47 for application to computer 14.

An additional temperature sensor 29 may advantageously be placed on flange 13 such that a temperature measurement is made at the discontinuity between housing 40 and return line 26 is applied to computer 14 via lead 27 and A/D converters 47.

In a preferred embodiment of housing 40, an extension 50 of the housing 40 extends partially into the interior of line 26 so as to prevent excessive angular dispersion of the pulses and false echo returns from the discontinuity.

The velocity probe sensor 12 is preferably an ultrasonic Doppler velocity sensor known in the art of sonic velocity sensors. Typically, such sensors contain two piezo-electric crystals mounted at the end of the probe 52 in the vicinity of the height measurement by head 42. One crystal continuously emits ultrasonic waves into the fluid, and the other crystal receives the ultrasonic waves reflected by the fluid particles. These received waves have a shift in frequency with respect to the transmitted waves proportional to the velocity of the reflecting particles. A Doppler shift signal representative of the velocity measured by probe 52 in the fluid is applied to microprocessor 41 via lead 39. Microprocessor 41 preferably performs digital processing of the doppler signals. An analog output signal proportional to the velocity of the fluid at probe end 52 is applied on lead 39' to A/D converters 47 for input to computer 14.

The measuring tip or end 52 of velocity sensor 12 is preferably disposed within the return line 26 to give a fixed measuring point approximately one-third the maximum fluid flow height from the bottom of the line 26. This fixed measuring point is entered into the computer 14 for calculation of the average velocity from the measured velocity for both turbulent flow and laminar flow.

A wash head 56 is advantageously provided within sensor S to wash probe end 52 of sensor 12 during zero flow conditions. Pressurized water source 58 provides the water to accomplish cleaning of the probe thereby obviating the need for manual cleaning of the probe if mudcake build-up were to occur. Wash head 56 is also used in the zero flow measurement described below to determine whether or not velocity probe sensor 12 is properly working.

COMPUTER PROCESSING OF INPUT INFORMATION

Figure 4C:
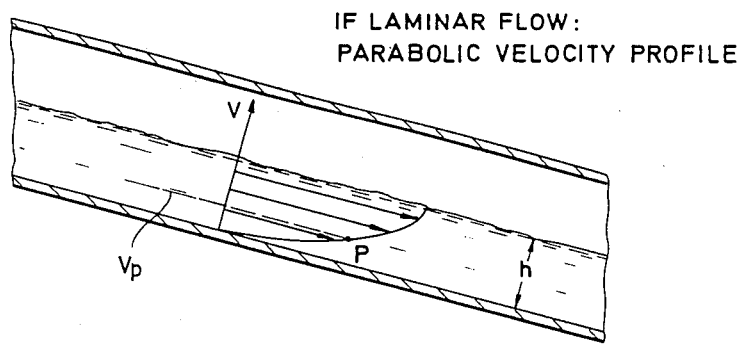
FIG. 4C illustrates a laminar flow pattern and shows the velocity sensor measure point in the fluid and is used to illustrate determination of the laminar conversion constant used to determine average velocity for laminar flow.
Figure 4D:
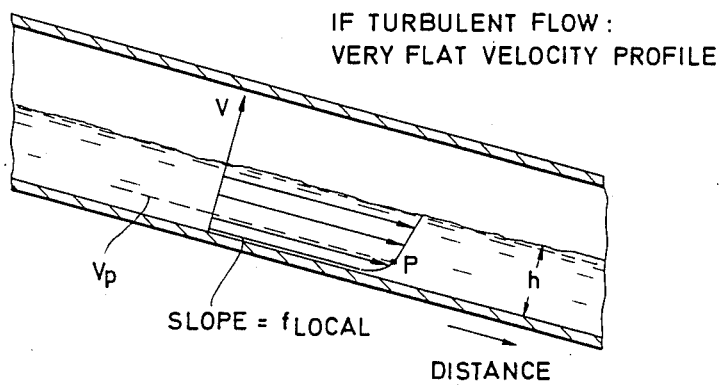
FIG. 4D illustrates a turbulent flow pattern and shows the use of the $f_{local}$ factor in determining the initial slope of the turbulent flow profile so as to more accurately determine the turbulent conversion constant used to determine average velocity for turbulent flow.
Figure 4A:
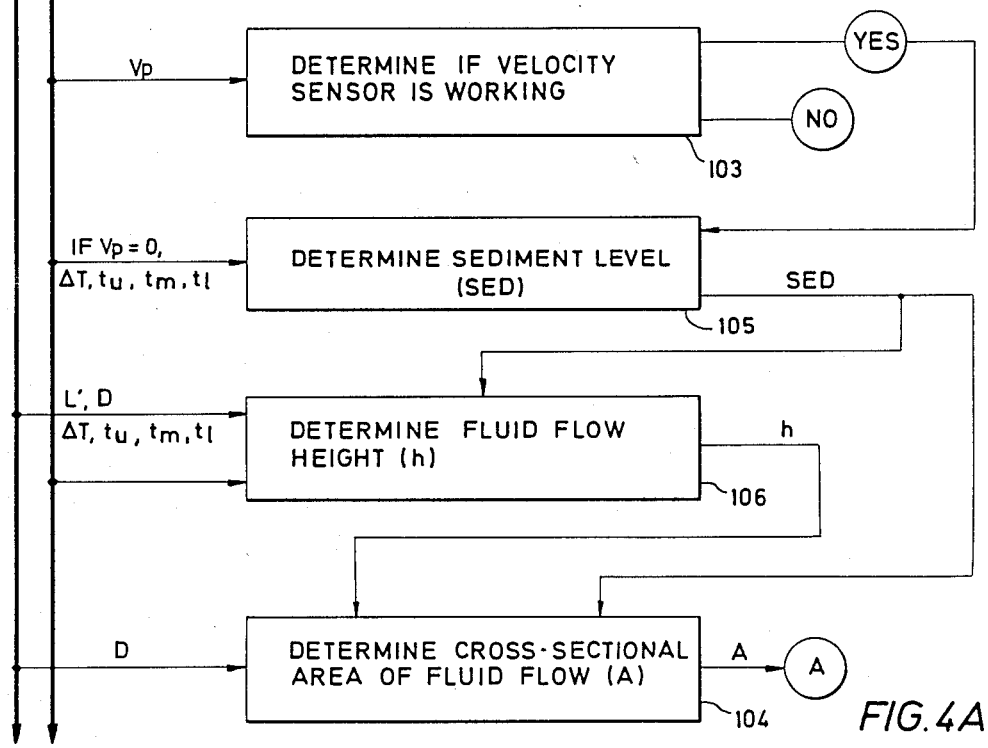
FIGS. 4A and 4B present a logic flow diagram illustrating the method of the system.
Figure 4B:
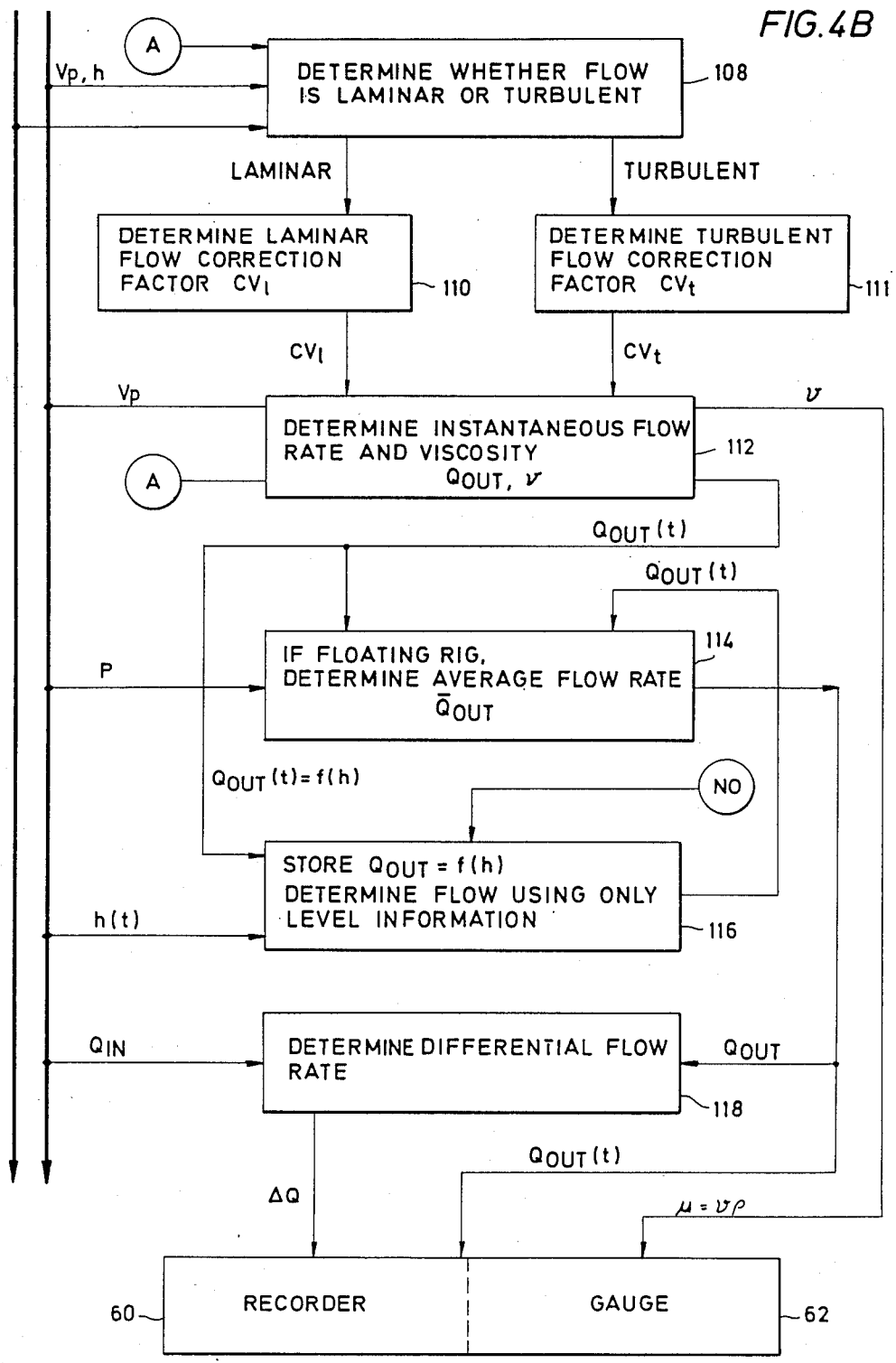

The processing of level and velocity information to produce an accurate determination of return line volumetric flow rate may be better understood from the flow chart of FIGS. 4A and 4B. The flow chart is a logic flow diagram having logic boxes representative of a digital program stored in ROM memory 34 (FIG. 2) of computer 14. The computer 14 is reset at the beginning of the operation which automatically establishes registers in the CPU 32 to hold the address of memory locations in RAM 30 that are to be accessed for data. Such data include the stored input parameters as indicated in box 100.

As indicated by box 200, signal input measurements via leads 64, 44, 48, 27, 39, 43, 92 and 96 are continuously monitored by computer 14. CPU 32 under program control periodically performs the steps of FIGS. 4A and 4B to produce output signals representative of $Q_{out}$, the flow rate of pipe 26, $\Delta Q$ the difference between $Q_{out}$ and $Q_{in}$, the input flow rate into the well, and $\mu$, the viscosity of the flowing fluid.

TEMPERATURE COMPENSATION OF ΔT MEASUREMENTS TO DETERMINE INSTANTANEOUS HEIGHT OF FLOW

A determination of height h is periodically made as indicated in box 106 with input information of transit time $\Delta T$ from level detector sensor 10 and the temperature measurements along the path of the ultrasonic pulse between the head 42 and the fluid flowing in return pipe 26. The distance $M=L+L'$ to the top of the returning drilling fluid is computed in calculating unit 28 in terms of the product of the velocity of sound and transit time $\Delta T$. The velocity of sound is preferably compensated by the temperature measurements, $t_u$, $t_m$ and $t_l$.

FIGS. 5A and 5B illustrate the technique for compensation. A relationship $t=f(x)$ between absolute temperature and the distance between the fluid and the ultrasonic head is determined, for example by fitting a polynomial between the three points $x=0$, $t=t_u$; $x=x_1$, $t=t_m$; and $x=x_2$, $t=t_l$. Of course if only the temperature at the head, $t_u$ and the fluid $t_l$ are available, a straight line may be determined as the functional relationship between t and x.

The velocity of sound in the air through which the ultrasonic pulses are passing is determined by calculating an average velocity of sound:

$$C_{avg} = \frac{1}{X_2} \int_{x=0}^{x=x_2} \sqrt{\gamma R f(x)}\, dx$$

where $\gamma$ and R are predetermined constants and $f(x)$ is the functional relation obtained by fitting a curve between the absolute temperatures measured at the distances between the fluid and the head. Such measurements and calculation insure an accurate determination of level h and area A of the fluid flowing in the line. The distance M, equal to L+L' as illustrated in FIG. 3 is then determined as $$M=L+L'=\Delta T(C_{avg}).$$

The diameter D of the cylindrical return line 26 and the distance L' from the head 42 to the return line 26 are obtained from the stored parameters in memory 34. The level of the fluid is then determined:

$$h = D - (M - L').$$

DETERMINATION OF SEDIMENT LEVEL (SED)

The level sensor 10 is preferably instructed under program control by the computer 14 to provide data at zero flow for sediment in the return line. Conventional flow indicating means in the return line may alternatively be electrically coupled to the computer 14 to provide the data of zero flow.

The apparatus illustrated in FIG. 2 may be used to measure sediment level in the return line at zero flow, but a determination as to the proper operation of velocity probe 52 is desirable. Box 103 of FIG. 4A illustrates this periodic determination under computer control. To achieve this objective, a spray jet of water from head 56 from water source 58 is directed under program control to probe 52. If a velocity is measured from probe 52, via microprocessor 41, then logic stored in program control of computer 14 determines that the velocity information from probe 52 is correct, and that the level information from head 10 and microprocessor 45 is correctly measuring sediment level SED. Logic box 105 illustrates the determination of sediment level (SED).

The distance to the top of the sediment is computed in the calculating unit 28 in terms of the product of the velocity of sound and transit time $\Delta T$. The level of the drilling fluid (h) is then computed by subtracting the sediment distance SED from the calculation described above, that is: $h = D - (M - L') - \text{SED}$. The determination of sediment and/or foreign matter in the return line provides a more accurate cross-sectional area A as shown by conventional determination of A with reference to the geometry illustrated in FIG. 3 and, therefore, a more accurate volumetric flow rate is determined.

DETERMINATION OF FLOW REGIME

As indicated by box 108 in FIG. 4B, a determination of the flow regime, that is whether the flow is laminar or turbulent, is made under program control. The determination begins with an assumption that the flow is laminar. This assumption is tested periodically in real time with input data of velocity v and level h measured by sensor S. It is known that the flow rate for laminar flow is a function of the kinematic viscosity of the fluid $$\nu = \mu/\eta,$$

the level of the flowing fluid h, its velocity v and the return line geometry, that is, $$Q_{lam} = f(\nu, h, v, D, \theta, g).$$

Figure 6C:
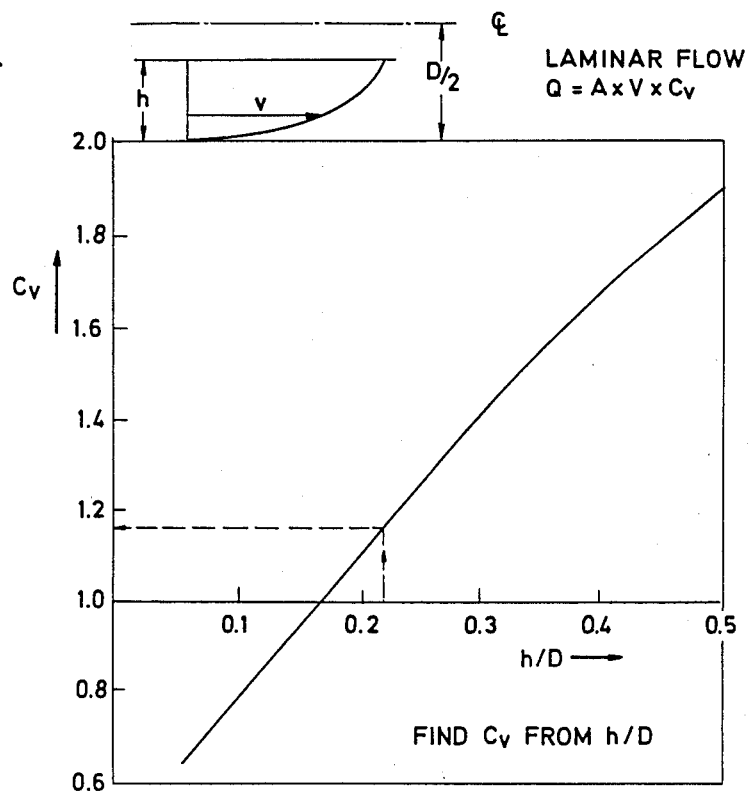
FIG. 6C shows the relationship between the parameter h/D and Cvl for laminar flow, where Cvl is the laminar velocity profile correction factor used to determine average velocity for laminar flow.

As illustrated by FIGS. 4C and 6C, an exact correction factor Cvl can be computed for laminar flow because of its parabolic velocity profile and from information of the measured level h and the height or position P where velocity v is measured. Thus, the flow, $Q_{lam}$ is, $$Q_{lam} = v \times A \times Cvl \quad (1)$$

based on the area determination of box 104, as shown in FIG. 4A and the velocity signal measurement.

Next under program control, a tabular relationship between $$\frac{2 Q_{lam} \nu}{(g \sin \theta) D^4} \text{ and } h/D$$

is addressed in computer 14 as illustrated in FIG. 6A. That is, with knowledge of the measured level h, and hence h/D, the corresponding tabulated value of $$\frac{2 Q_{lam} \nu}{g (\sin \theta) D^4}$$

is determined, and hence a value of $\nu^*$ is determined knowing $Q_{lam}$, (g sin $\theta$) and $D^4$, as defined by box 100.

Next, under program control, the value of $\nu^*$ is used to calculate a Reynolds number R for the flow:

$$R^* = \frac{v d_h}{\nu^*}$$

where, as before, v is the measured velocity, and $d_h$ is the hydraulic diameter of the pipe, $$\left( d_h = \frac{A}{P} \right)$$

where A is the cross-sectional area of the fluid flow as determined in box 104 and P is the "wetted" perimeter of the actual fluid flowing (calculated from D and h).

As illustrated in FIG. 6B, if R* as determined from the calculations above is less than 2100, the flow is actually laminar and the flow $Q_{lam}$ calculated above (Equation 1) is the correct value of the flow rate in the pipe 26. If that determination is made by the computer program in logic box 108, the correction factor $C_{vl}$ is as previously determined (Logic Box 110) from the geometrical relationship between $C_v$ and h/D as illustrated in FIG. 6C. Having determined that the flow is laminar, the kinematic viscosity $\nu$ is also correct and the viscosity $\mu = \nu \rho$ can be found from the density $\rho$.

If R* is greater than 2100, the flow regime must be turbulent flow as illustrated in FIG. 6B. With turbulent flow, the velocity profile is almost uniform, but to determine a very accurate value for the correction factor to be applied to the turbulent flow velocity, the following sequence of calculations is made in logic box 111.

First a turbulent flow rate is determined by assuming that Cv = 1: $Q = A \times v \times (1)$.

Next, the energy $E_c$ of the fluid flowing under critical flow conditions is calculated:

$$E_c = \frac{3}{2} \left( \frac{Q^2}{g} \right)^{\frac{1}{3}}$$

where Q is the flow rate assumed from step 1.

Next, the energy loss hf in the return line 26 is calculated:

$$hf = Z + E_c - h - \frac{v^2}{2g}$$

where Z, and g are as defined in stored parameter box 100 and h and v are the measured level and velocity.

Next, the average friction factor over the whole lateral flow length $LEL=(H^2+Z^2)^{\frac{1}{2}}$ of the pipe is determined:

$$f_{avg} = \frac{hf}{\frac{LEL}{d_h} \cdot \frac{v^2}{2g}}.$$

Finally a predetermined relationship $f_{local}=F(f_{avg})$ between the friction factor $f_{local}$ at the point of the level and velocity measurement to $f_{avg}$, which is stored in memory of computer 14, is addressed to yield $f_{local}$.

Figure 7:
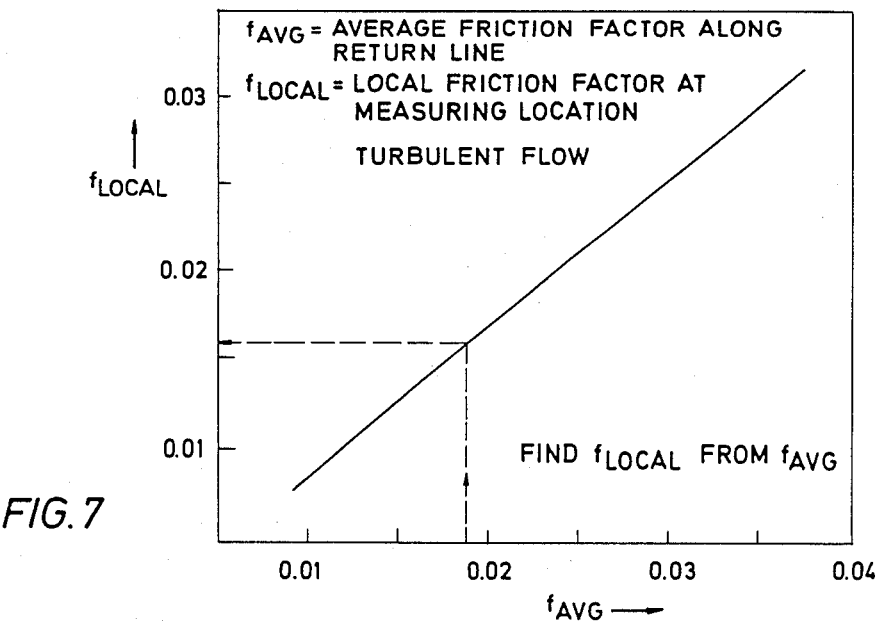
FIG. 7 shows a relationship between the average friction factor $f_{avg}$ for the return line and the local friction factor $f_{local}$ at the position in the return line where the level and velocity are measured.

FIG. 7 graphically illustrates the relationship between $f_{local}$ and $f_{avg}$. The correction factor $C_{vt}$ is determined more accurately having a value of local friction factor, $f_{local}$, in that the friction factor at the local measuring point for level h and velocity determines the initial slope of the turbulent velocity profile. FIG. 4D illustrates the relationship between velocity and level of flow at the velocity measurement point P. The value of $f_{local}$ defines the initial slope for the velocity profile for turbulent flow and allows a more accurate determination of $C_{vt}$.

The calculations described above are carried out under program control represented by box 111. With the correction factor $C_{vt}$, the instantaneous flow rate for turbulent flow is calculated as $Q_{out}=A \times v \times C_{vt}$.

Viscosity of the turbulent flowing fluid is determined from the relationship between $f_{avg}$ and the Reynolds number for turbulent flow as illustrated in FIG. 6B.

DETERMINATION OF AVERAGE FLOW RATE FOR A FLOATING DRILLING RIG

The instantaneous flow rate determinations as described above may be used directly where the apparatus of FIG. 2 is used on a bottom supported marine drilling rig or a land rig, but where the rig is a "floater", the instantaneous flow rates vary with the heave and pitch of the vessel. For that reason an "average" flow rate must be determined for an accurate determination of $Q_{out}$ in order to detect a dangerous kick or fluid loss condition in the well in combination with $Q_{in}$ data from mud pumps 16.

FIG. 8 illustrates a preferred method for averaging instantaneous flow rate data Q output from logic box 112. The position or "height" of the rig as a function of time is measured and stored as a function of time from sensor 90 via lead 92 to computer 14 along with vector information as to whether the position has increased or decreased from a previous time increment $\Delta t$. The instantaneous flow rate $Q_t$ is associated with that position and vector as a function of time. For example, FIG. 8 shows that at $t=t_8$, an instantaneous value of $Q_t$ and the rig's position P, and up vector ↑ is stored.

The averaging method determines an average Q at each time interval, for example $t=t_8$. The method, according to the invention, is to look backward in time over the stored data to find a previous position with the same vector. For example as illustrated by FIG. 8, the first time in which the position and vector is the same as that of time $t=t_8$ is at $t=t_2$. Selecting the period $t=t_8$ backward to $t=t_2$ defines the averaging period T which is used to average the instantaneous values of flow rate Q associated with each time increment.

The averaging method described above is advantageous in that it achieves an average relatively quickly in terms of the time period T of the actual up-down heave motions of a floating drilling rig, and over the period T the net contribution of heave to the flow out is zero.

USE OF LEVEL SENSOR ALONE TO MEASURE FLOW

If as discussed above, the computer 14 under program control in logic box 103 determines that the velocity sensor is no longer working, control is passed to logic box 116, as shown in FIG. 4B.

Logic box 116 indicates that while the velocity sensor was previously working, data relating $Q_{out}(t)$ and level (h) are being applied to box 116 where they are stored in memory. An empirical relationship between $Q_{out}(t)$ and level (h) is thus formed in memory based on actual real time operating history for the rig and sensors. When logic box 116 is entered by virtue of a signal that the velocity sensor is no longer working, the experience table between Q(t) and h(t) is entered with an instantaneous value of h(t) to produce an output of instantaneous flow rate $Q_{out}(t)$ which is then passed to logic box 114 for the average flow determination as described above.

DETERMINATION OF DIFFERENTIAL FLOW RATE

As illustrated by logic box 118, the difference between the average output flow rate, $Q_{out}$, as output from logic box 114 and the input flow rate into the well $Q_{in}$ as input from mud pumps 16 is calculated and applied to recorder 60 and gauge 62. Average flow rate $Q_{out}$ and viscosity $\mu$ are also applied to recorder 60 for producing a graphical record of the flow rate and viscosity of the flow in the return line. A negative reading of gauge 62 indicates "lost circulation" danger, while a positive reading indicates kick danger.

Advantageously the method and apparatus of the invention measures flow rate in a drilling rig return line with improved accuracy. It may be disposed on the standard connector of the return line obviating extensive rig modifications for its deployment. It works with water based or oil based muds and may be used under any kind of flow conditions such as tranquil or shooting, laminar or turbulent. The apparatus not only measures flow rate, but also viscosity of the mud. Since the measurement is an absolute flow measurement, no field calibration is required and can be employed on heaving offshore drilling rigs. Averaging of the heave period allows a time average of return line flow to be determined.

Various modifications and alterations in the described methods and apparatus will be apparent to those skilled in the art of the foregoing description which does not depart from the spirit of the invention. For this reason, these changes are desired to be included in the appended claims. The appended claims recite the only limitations of the present invention and the descriptive manner which is employed for setting forth the embodiments and is to be interpreted as illustrative and not limitative.

What is claimed is:

1. Apparatus adapted for use in a drilling fluid return line system of a drilling rig to determine a volumetric fluid flow rate, said apparatus comprising,
    first sensor means for generating a signal corresponding to a level of a fluid in the return line,
    second sensor means for generating a signal corresponding to a measured velocity of said fluid in the return line system, and processing means responsive to said first sensor means and said second sensor means for detecting the type of flow regime of fluid flowing in the return line, and dependent on the type of flow regime detected, determining the volumetric fluid flow rate in the return line.

2. Apparatus of claim 1 wherein said first sensor means comprises an ultrasonic level sensor.

3. Apparatus of claim 1 wherein said second sensor means comprises an ultrasonic Doppler velocity sensor.

4. Apparatus of claim 3 further comprising
means for in situ cleaning of said ultrasonic Doppler probe sensor.

5. Apparatus of claim 1 wherein if the fluid flow regime is detected to be a laminar fluid flow, a velocity profile model is used with said measured velocity to calculate the average velocity to determine the volumetric fluid flow rate.

6. Apparatus of claim 1 wherein a free gravity flow equation is used by said processing means to determine the energy loss in the return line and to determine a friction factor f as a function of determined energy loss of the form, $$f = K \text{ (energy loss}/V^2)$$

where K is a constant of proportionality and V is the measured velocity in the return line.

7. Apparatus of claim 6 wherein if the fluid flow regime is determined to be turbulent fluid flow, said measured velocity and said friction factor are used to determine the average velocity to determine the volumetric fluid flow rate.

8. Apparatus of claim 1 further comprising
a sediment calibration means adapted for use with said first sensor means for use in determining the cross-sectional area of said fluid in the return line system.

9. Apparatus of claim 8 wherein said sediment calibration means scans only when no fluid flow is indicated in the return line system and the last scan of the calibration means is retained in a memory of the processing means for calculating the volumetric fluid flow rate of the return line system measured in real time.

10. Apparatus of claim 1 wherein said first sensor means and said second sensor means are adapted for retrofitting in a preexisting opening in the return line system.

11. Apparatus of claim 1 further comprising means for recording fluid flow rate and viscosity as a function of time.

12. Apparatus of claim 1 further comprising
means for compensating said volumetric fluid flow rate for the effect of floating rig heave on said flow rate.

13. Apparatus of claim 1 further comprising
means for generating an experience table of volumetric fluid flow rate as a function of measured level and velocity in said return line system,
means for determining whether or not said second sensor means is properly operating, and
means for accessing said experience table with only said measured level signal to determine volumetric fluid flow rate if said second sensor means is not properly operating.

14. Apparatus adapted for use in a return line system of a drilling rig to aid in determining a volumetric fluid flow rate, said apparatus comprising a first sensor means for generating a signal corresponding to a level of a fluid in the return line system,
a second sensor means for generating a signal corresponding to a measured velocity of said fluid at a point in the return line system,
memory means for storing input parameters,
means responsive to said first sensor means, said second sensor means and said memory means for detecting the type of flow regime of fluid flowing in the return line and dependent on the type of flow regime detected, determining the volumetric fluid flow rate in the return line system.

15. A method for use with a return line of a drilling rig to determine a volumetric fluid flow rate, comprising the steps of:
providing a first sensor means for generating a level signal corresponding to a level of a fluid in the return line system, providing a second sensor means for generating a velocity signal corresponding to the velocity of said fluid in the return line system and providing a processing means responsive to said level signal and said velocity signal,
determining in said processing means a cross-sectional area of said fluid in said return line system from said level signal of said first sensor means,
determining in said processing means whether the fluid flow regime is a laminar flow or a turbulent flow to determine the average velocity from said measured velocity, and
determining in said processing means the volumetric fluid flow rate from said average velocity and said cross-sectional area.

16. A system for determining the volumetric flow rate of material flowing in a drilling rig return line partially filled with said material, said system comprising,
an ultrasonic pulse echo measurement sensor for generating a first signal indicative of material level in said return line;
an ultrasonic Doppler velocity measurement sensor for generating a second signal indicative of the velocity of said material; and
a processor responsive to said first and second signals for determining the volumetric flow rate corrected for the effects of a laminar or turbulent flow regime.

17. The system as recited in claim 16 further including a system for determining when there is no material flow in said return line and for determining the level of sediments in said return line when there is a zero flow determination, and a memory for retaining the last sediment level determination for use in determining volumetric flow rate when material flow resumes.

18. The system as recited in claim 16 further including a system for cleaning said ultrasonic Doppler probe sensor when there is no flow in the return line.

19. The system as recited in claim 16 further including a comparator for comparing the volumetric flow rate in the drilling rig return line with an indication of volumetric flow of material flowing into a borehole associated with said drilling rig.

20. The system as recited in claim 16 wherein the system is mounted on a floating platform and further includes a sensor for measuring the vertical position of the floating platform and processing apparatus responsive thereto for averaging the volumetric flow determination over a variable period determined by the time period required for the floating platform to complete one complete heave cycle.

21. A method for determining a volumetric flow rate of a material flowing in an inclined drilling rig return line at least partially filled with flowing material, comprising the steps of:
measuring the level of said material in said return line;
measuring the flow velocity of said material in said return line;
in response to the level measurement and to a predetermined return line geometry, determining the cross-sectional area of material flowing in said return line;
determining the average velocity of material flowing in said return line corrected for the existing laminar or turbulent flow regime in response to the velocity measurement; and
determining said volumetric flow rate in response to the corrected average velocity and to said cross-sectional area determination.

22. The method as recited in claim 21 wherein said step of determining the cross-sectional area of material flowing in said return line includes the steps of determining when there is no flow in said return line and of determining the level of sediments on the bottom of said return line during the periods of no flow.

23. The method as recited in claim 21 wherein said step of determining average velocity of material flowing in said return line includes the steps of measuring material velocity at a single predetermined local point in said return line and utilizing a laminar flow velocity profile model and said cross-sectional area to convert the local velocity into an average velocity when the flow regime of the flow in the return line is laminar.

24. The method as recited in claim 21 further wherein said step of determining average velocity of material flowing in said return line includes the steps of:
in response to the measured velocity, implementing a free gravity flow model to determine the energy loss in said return line and to determine a friction factor f as a function of determined energy loss of the form, $$f = K \text{ (energy loss}/V^2\text{)}$$

where k is a constant of proportionality and V is the measured velocity in said return line;
in response to said friction factor f, determining the average velocity of said material corrected for the effects of turbulence when said flow is turbulent; and
in response to said cross-sectional area and said corrected average velocity, determining volumetric flow rate corrected for the turbulent flow regime.

25. The method as recited in claim 21 further including the steps of generating a data base of measured level and of volumetric flow rate based on level and velocity measurements and accessing said data base with a level measurement to determine volumetric flow rate when a velocity measurement is not available.

26. The method as recited in claim 21 wherein the return line is mounted on a floating platform subject to heave and further includes the steps of measuring the vertical position (P) of the floating platform and in response thereto, averaging the volumetric flow determination over a variable period determined by the time period required for the floating platform to complete one complete heave cycle.

27. The method as recited in claim 21 further including the steps of comparing the volumetric flow rate in the drilling rig return line with an indication of volumetric flow of material flowing into a borehole associated with said drilling rig.

* * * * *